United States Patent [19]
Daniels

[11] 3,937,375
[45] Feb. 10, 1976

[54] BUMPER SUPPORT FOR A BOAT LOADER

[76] Inventor: Everette E. Daniels, 221 Locust St., Des Moines, Iowa 50309

[22] Filed: Oct. 29, 1974

[21] Appl. No.: 518,454

[52] U.S. Cl. .............................. 224/42.07; 214/450
[51] Int. Cl.² ........................................... B60R 9/00
[58] Field of Search ............ 280/500, 501, 502, 505; 293/60, 69; 224/24.07, 42.03 R, 42.1 H; 214/450; 248/43, 226 R, 214

[56] References Cited
UNITED STATES PATENTS

| | | | |
|---|---|---|---|
| 2,542,907 | 2/1951 | Dayton et al. | 280/502 |
| 2,762,542 | 9/1956 | Hodgeman | 224/42.03 R |
| 2,772,799 | 12/1956 | Bridinger | 224/42.03 R |
| 3,113,789 | 12/1963 | Safford | 280/502 |
| 3,702,197 | 11/1972 | Sellers | 280/502 |

Primary Examiner—John J. Love

[57] ABSTRACT

A unit mountable on a rear bumper of a vehicle, and which does not interfere with the conventional trailer hookup, the device including a pair of bumper straps which at one end are hooked over the upper edge of the bumper, the rear ends of the bumper straps being downwardly bent and secured to a rear end bar, the bumper strap supporting angle braces which hold up angle irons upon which a steel plate seat is mounted and which has a central opening for a boat loader, the rear end bar having a pair of braces extending therefrom which are hooked under a rear edge of the bumper so to provide stability for the device which also includes a rubber guard to protect the car bumper from becoming scratched up or otherwise damaged.

3 Claims, 3 Drawing Figures

BUMPER SUPPORT FOR A BOAT LOADER

This invention relates generally to automotive accessories.

A principal object of the present invention is to provide a bumper support for a boat loader, and which may be designed either for a straight flat bumper or which can be designed to fit bumpers of other configurations.

Another object of the present invention is to provide a bumper support for a boat loader which can carry the boat loader with the trailer hooked up.

Another object of the present invention is to provide a bumper support for a boat loader which will carry the weight of two hundred pounds or more.

Still a further purpose is to provide a bumper support for a boat loader which can be installed on a car in less than two minutes, and which does not interfere with the trailer hook up.

Still a further purpose is to provide a bumper support for a boat loader in which the bumper support weight only ten pounds so that it can be easily and conveniently handled.

Still a further purpose is to provide a bumper support for a boat loader wherein the boat can be unloaded without the necessity of unhitching the trailer.

Yet a further purpose of the present invention is to provide a bumper support for a boat loader wherein there is no additional expense for the installations thereof.

Other objects are to provide a bumper support for a boat loader which is simple in design, inexpensive to manufacture, rugged in construction, easy to use and efficient in operation.

These and other objects will be readily evident upon a study of the following specification and the accompanying drawing, wherein.

Figure 1:
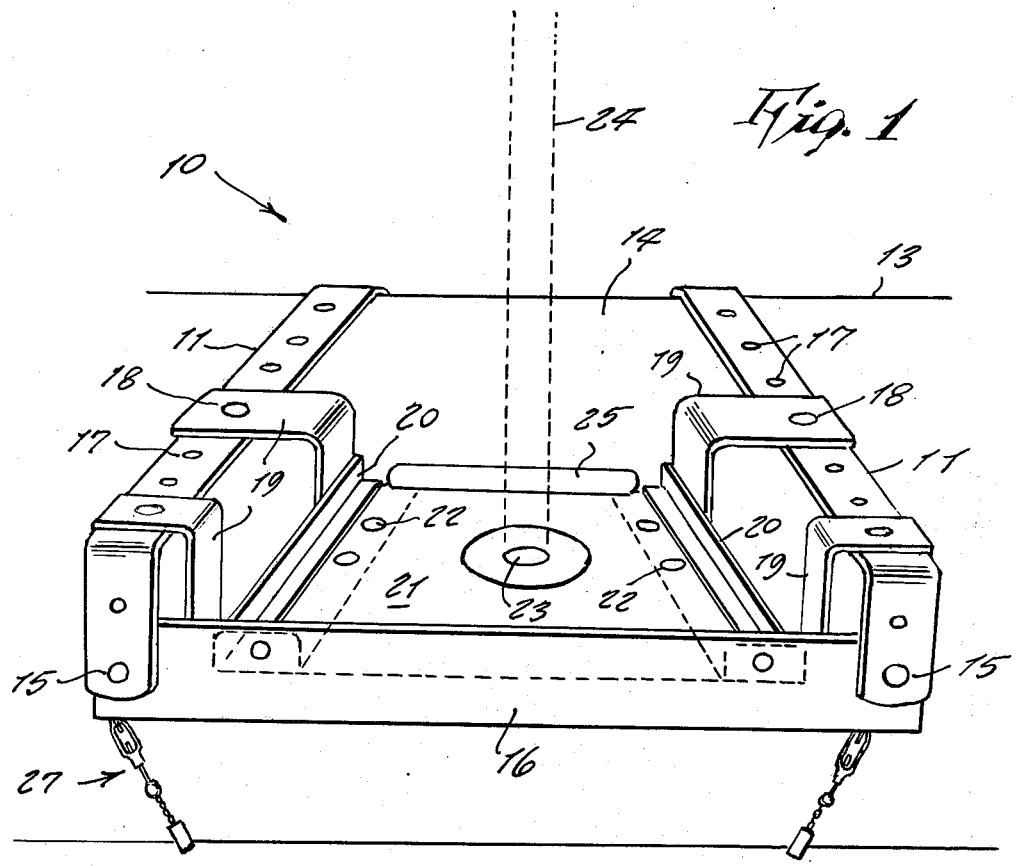
FIG. 1 is a rear perspective view of the present invention.
Figure 2:
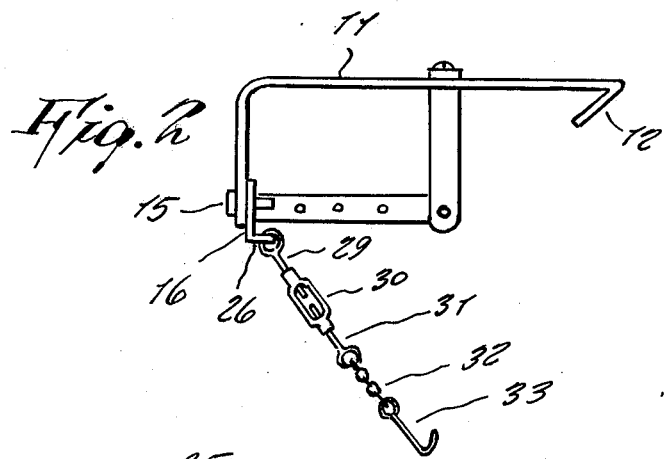
FIG. 2 is a side elevation thereof.
Figure 3:
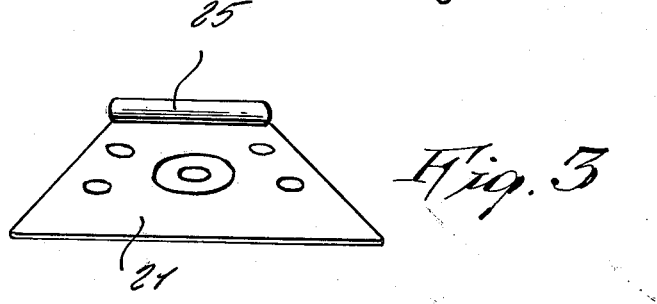
FIG. 3 is a rear perspective view of the steel plate seat member that comprises a component of the present invention.

Referring now to the drawing in detail, reference numeral 10 represents a bumper support for a boat loader according to the present invention, wherein there are a pair of bumper straps 11 each one of which at one end is bent into an acute hook 12 for being hooked around an upper edge 13 of a car bumper 14.

A rear portion of each of the bumper straps is downwardly bent at right angles and a lower end of the bumper strap are secured by means of rivets 15 to opposite ends of a rear end bar 16.

Each of the bumper straps 11 includes a row of spaced apart openings 17 along the length thereof and which may be selectively used for receiving a mounting bolt or rivet 18 for attachment of a pair of seat support angle irons 19. Each pair of angle irons 19 secured to the bumper strap hold up an elongated angle iron 20 of to which one side of a steel plate seat 21 is secured. Bolts or rivets 22 rigidly affix the seat 21 to the angle braces 19, as shown in FIG. 1.

A central opening 23 is formed through the steel plate seat 21, the opening 23 being adaptable for the boat loader 24.

A forward end of the seat 21 has a rubber guard 25 secured thereto and which is for the purpose of protecting the car bumper 13 from becoming scratched or otherwise damaged by the present device.

A bracket 26 is also secured by each rivet at the opposite end of the rear end bar 16, each bracket 26 being connected to a tension unit 27 for being hooked under a bottom edge 28 of the bumper 14. Each tension unit 27 includes an eye bolt 29 which is connected to the bracket 26 at one end and to a turnbuckle 30 at its opposite end. The turnbuckle 30 by means of eye bolt 31 is connected to a short length of chain 32 which at its other end is attached to a hook shaped bracket 33 that hook under the lower edge 28 of the bumper 14.

Thus there is provided a unit that can be ridgedly secured to the car bumper sufficiently strong that it will support two hundred or more pounds. Thus it is readily evident that the present invention serves a useful purpose in a more efficient manner.

While various changes may be made in the detail construction, it is understood that such changes will be within the spirit and scope of the present invention as is defined by the appended claims.

What I claim is:

1. In a bumper support for a boat loader, the combination of a pair of spaced apart bumper traps, one end of each of said bumper straps having an acute hook formed therein for hooking over an upper edge of a car rear bumper, a rear opposite end of said strap being downwardly bent and riveted to a transversely extending rear end bar, means by means of a tension unit to rigidly secure said bumper support to a lower edge of said car bumper, and means for said bumper support to retain a boat loader loading rod, said means for securement of said unit to a lower edge of said car bumper comprising a paid of tension units each one of which at one end is secured to an angle bracket mounted at an end of said rear bar, said bracket being connected to an eye bolt attached to a turnbuckle which at its opposite end be means of an eye bolt is connected to a short length of chain attached at its opposite end to a bracket that hooks under said automobile bumper rear lower edge.

2. The combination as set forth in claim 1, wherein said means for supporting boat loader loading rod comprises a plurality of angle braces attached to each of said bumper straps, said angle braces supporting a pair of longitudinal angle irons upon which there is supported a steel plate seat, said seat having a central opening for said boat loader.

3. The combination as set forth in claim 2, wherein a front end of said steel plate seat is fitted with a rubber guard to protect said car bumper from being scratched thereby.

* * * * *